United States Patent [19]
Shand et al.

[11] 3,708,723
[45] Jan. 2, 1973

[54] LOW POWER MAGNETIC CIRCUIT BREAKER

[75] Inventors: John R. Shand; William H. Reid, both of Easton, Md.

[73] Assignee: Airpax Electronics Incorporated, Cambridge, Md.

[22] Filed: March 5, 1971

[21] Appl. No.: 121,409

[52] U.S. Cl. ..............317/31, 317/155.5, 335/179, 335/182, 335/234
[51] Int. Cl............H01j 9/46, H01h 9/00, H01f 7/00
[58] Field of Search....317/27 R, 31, 155.5; 335/179, 335/182, 234

[56] References Cited

UNITED STATES PATENTS 3,475,708    10/1969    Schreckenberg et al. ........335/234 X
3,325,685    6/1967    Hoel..................................317/58 X
3,525,903    8/1970    Morris et al. ......................317/31 X

*Primary Examiner*—L. T. Hix
*Attorney*—Le Blanc & Shur

[57] ABSTRACT

Disclosed is a circuit breaker which may be operated on relatively low power. It comprises a polarized relay having a spring-biased armature rotatable to trip a conventional circuit breaker toggle. The armature is released by the flux from a low power coil bucking out the polarizing flux from a permanent magnet. The breaker is disclosed in overvoltage protection and/or undervoltage protections circuits, as well as in a ground fault interruption circuit, and may be used with a conventional breaker overcurrent coil and toggle trip assembly.

5 Claims, 8 Drawing Figures

INVENTORS.
JOHN R. SHAND
WILLIAM H. REID

BY

ATTORNEYS.

INVENTORS.
JOHN R. SHAND
WILLIAM H. REID

BY *LeBlanc and Shur*

ATTORNEYS.

LOW POWER MAGNETIC CIRCUIT BREAKER

This invention relates to magnetic circuit breakers and more particularly to a circuit breaker incorporating a polarized relay operable to trip the breaker and open a circuit with a small amount of electrical energy. The low power circuit breaker is useful alone or in combination with overcurrent trip devices and may be used to provide undervoltage, overvoltage and/or ground fault interruption.

As is known, the conventional magnetic circuit breaker generally comprises a current coil connected in series with the circuit breaker contacts. This coil conventionally surrounds a core containing a delay tube such that when an overcurrent passes through the coil, an armature is attracted to the polepiece of the core. Movement of the armature actuates a toggle latch sear, releasing the toggle and permitting it to collapse to open the circuit breaker contacts under the influence of a spring. For large overcurrents, the armature is usually immediately attracted to the core to cause immediate collapse of the toggle and tripping of the circuit breaker contacts. Smaller overcurrents cause tripping after a short time delay occasioned by the movement of a magnetic slug through hydraulic oil in the delay tube.

Conventional magnetic circuit breakers of this type require a substantial amount of electrical energy or electrical power to trip the circuit breaker. Because of this, they are not suited for use in situations where large amounts of electrical tripping power are not available.

The present invention is directed to a circuit breaker which may be magnetically tripped by only a small amount of electrical energy so that the circuit breaker finds utility in a variety of applications, particularly where high power signals for tripping are not available. In the present invention, the circuit breaker is provided with a balanced armature positioned adjacent a polarized relay containing one or more electrical coils. One or more of the relay coils is wound to oppose the polarizing flux such that a small change in current flow through the coil causes the relay to release its armature. Movement of the armature causes it to engage the circuit breaker latch sear, tripping the circuit breaker and opening the contacts in the circuit to be protected.

In one embodiment of the present invention, the polarized relay is incorporated into an undervoltage circuit breaker provided with differential windings. Modified embodiments include differential constructions in which the circuit breaker operates as an overvoltage protector or a combination undervoltage and overvoltage circuit breaker. In a further embodiment of the present invention, the polarized relay is connected into a ground fault interrupter circuit to provide increased protection, particularly in situations where there is a break in the grounded conductor of the ground fault interrupter circuit. The novel low power tripping device of the present invention may be used by itself or in combination with the conventional overcurrent coil and overcurrent tripping mechanism.

It is therefore one object of the present invention to provide an improved low power circuit breaker.

Another object of the present invention is to provide a circuit breaker actuated by a polarized relay.

Another object of the present invention is to provide a circuit breaker which combines low power tripping along with conventional overcurrent tripping operation.

Another object of the present invention is to provide a simplified, less expensive, and more reliable circuit breaker which may be used in a variety of applications.

Another object of the present invention is to provide a new and improved differential-type magnetic circuit breaker.

Another object of the present invention is to provide an improved ground fault interrupter particularly protecting against breaks in the grounded circuit.

Another object of the present invention is to provide a differential-type magnetic circuit breaker usable for undervoltage protection, overvoltage protection, or a combination of both.

These and further objects and advantages of the invention will be more apparent upon reference to the following specification, claims, and appended drawings, wherein:

Figure 1:
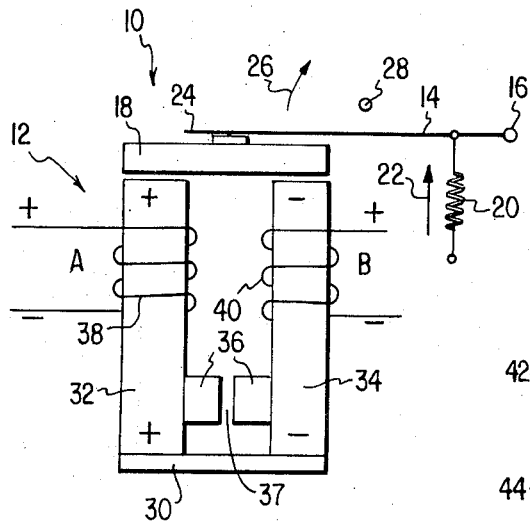
FIG. 1 shows a portion of a circuit breaker constructed in accordance with the present invention useful for undervoltage protection.

Referring to the drawings, a portion of a low power circuit breaker constructed in accordance with the present invention is generally illustrated at 10 in FIG. 1. The circuit breaker 10 comprises a polarized relay 12 which acts on an armature 14 which is pivotally mounted at one end as indicated at 16. Armature 14 consists of polepiece 18 loosely attached to end 24 of the armature in such a manner that polepiece 18 can move as necessary to provide a good mechanical and hence magnetic contact with cores 32 and 34. Polepiece 18 of armature 14 is normally held against cores 32 and 34 of relay 12 but when released by the relay, the armature 14 is biased by a compression spring 20 in the direction of arrow 22 so that the end 24 of the armature moves about pivot 16 in the direction of arrow 26. This movement of the armature under the influence of spring 20 causes the armature to engage the circuit breaker latch sear, indicated at 28, causing the circuit breaker to trip and its contact to open. The remaining portions of the circuit breaker, including the toggle and contacts, are omitted from FIG. 1 for the sake of clarity, but it is understood that they may be of conventional construction such that tripping of the circuit breaker latch sear 28 causes the toggle to collapse and the circuit contacts to open. Circuit breakers incorporating mechanisms of this type are shown, by way of example only, in assignee's U.S. Pat. Nos. 3,412,351, 3,444,488, 3,486,140 and 3,497,838, the disclosures of which are incorporated herein by reference.

Relay 12 of the circuit breaker comprises a permanent magnet 30 connected to a pair of cores 32 and 34 formed of suitable magnetic material, such as soft iron, a partial magnetic shunt illustrated at 36, and a pair of coils 38 and 40, labeled A and B, respectively. Coil 38 is wound around core 32 and coil 40 is wound around core 34. For the sake of clarity, the magnetic north poles are designated by + signs and the magnetic south poles by − signs such that core 32 forms a north pole and core 34 forms a south pole polarized by the permanent magnet 30. Also, for the sake of simplicity in the following description, voltages are assumed to be directly related to ampere turns on the coils. The partial magnetic shunt 36 consists of a short airgap in the order of 0.002 inch which provides a low reluctance path for alternating magnetic fields generated by coils 38, 40, and 68. The airgap 37 provides a relatively high reluctance to the magnetic field produced by permanent magnet 30. In essence, the AC magnetic path consists of core 38, polepiece 18, core 34, partial magnetic shunt 36, and airgap 37, while the DC magnetic path consists of core 38, polepiece 18, core 34, and permanent magnet 30.

Figure 2:
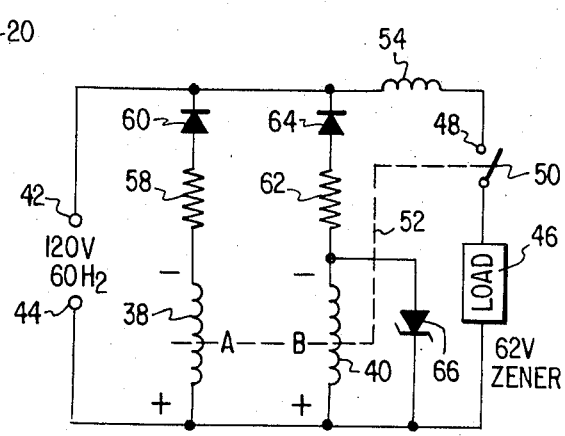
FIG. 2 is a circuit diagram showing the circuit breaker of FIG. 1 used as an undervoltage protector.

FIG. 2 is a circuit diagram of an undervoltage protector incorporating the low power circuit breaker 10 of FIG. 1. In FIG. 2, like parts bear like reference numerals. In FIG. 2, a pair of terminals 42 and 44 connect a suitable electrical source, such as a 120 volt 60 Hz line source, to a load 46 through a pair of circuit breaker contacts comprising stationary contact 48 and movable contact 50. Movable contact 50 is illustrated in FIG. 2 as actuatable from the coils 38 and 40 by the dashed line 52. Connected in series with circuit breaker contacts 48 and 50 is a conventional overcurrent coil 54. It is understood that this overcurrent coil may or may not be employed in a conventional manner as desired and that the undervoltage protector is completely operable with the overcurrent coil 54 omitted.

Connected across source terminals 42 and 44 in series with coil 38 is a resistor 58, labeled $R_1$, and a halfwave rectifier diode 60. Similarly, coil 40 is connected across the source terminals 42 and 44 in series with a resistor 62, labeled $R_2$, and a second halfwave semiconductor rectifier diode 64. It is understood that in the actual construction resistor 58 is formed by the resistance of coil 38 and a separate resistor is not normally required. Similarly, resistor 62 is formed by the coil resistance of coil 40. Likewise, the upper ends of coils 38 and 40 would be connected together and the rectifier diodes 60 and 64 replaced by a single diode.

Assuming a normal line voltage at terminals 42 and 44 in FIG. 2 of 120 RMS, resistor 58 is chosen to be of such a value that 70 volts peak appears across coil 38 or 70 ampere turns peak. The coil 38 is wound in the manner illustrated in FIG. 1 so that its magnetic polarity is oriented in a direction to aid or increase the flux created by the permanent magnet 30 in core 32. At the same normal line voltage of 120 RMS, the peak voltage or ampere turns of coil 40 is limited by a zener diode 66 connected across this coil to a value of 62 volts or 62 ampere turns peak. Coil 40 is wound in the manner illustrated in FIG. 1 so that its magnetic polarity is such as to oppose the flux on both coil 38 and the permanent magnet 30. At normal line voltage of 120 RMS, there is now an AC net flux of 70 − 62 or 8 ampere turns in polepiece 18. Since coil 38 is dominant by 8 ampere turns, this differential aids or increases the latching flux of the permanent magnet 30.

If the line voltage at terminals 42 and 44 drops to 104 volts, the ampere turns across coil 38 is 62, equal and opposite to the ampere turns of coil 40 which remains at 62. In this condition, there is 0 contributed AC flux. If the voltage at terminals 42 and 44 drops to 102 volts, the ampere turns of coil 38 becomes 61 or 1 ampere turn below that of coil 40. At this point, the 1 ampere turn of dominant flux from coil 40 is of such polarity as to oppose the permanent magnet flux and is of an amplitude adequate to release armature 14, operate latch sear 28, and trip the circuit breaker.

Figure 3:
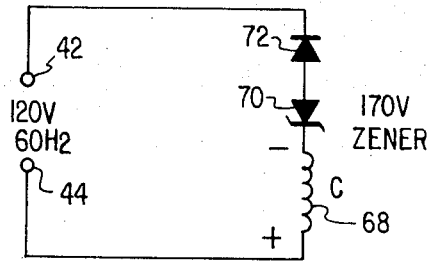
FIG. 3 is a circuit diagram of a modified construction showing a low power overvoltage circuit protector.

FIG. 3 shows a modified circuit for the circuit breaker forming an overvoltage protector. In this embodiment, the line terminals 42 and 44 are connected to a coil 68 of a polarized relay of the type illustrated in FIG. 1, labeled coil C, through a 170 volt zener diode 70 and a halfwave rectifier diode 72. The operation of the overvoltage protector of FIG. 3 will be readily apparent from the following description of FIGS. 4 and 5, which show a circuit breaker combining the undervoltage features of the embodiment of FIGS. 1 and 2 with the overvoltage feature of the embodiment of FIG. 3.

Figure 4:
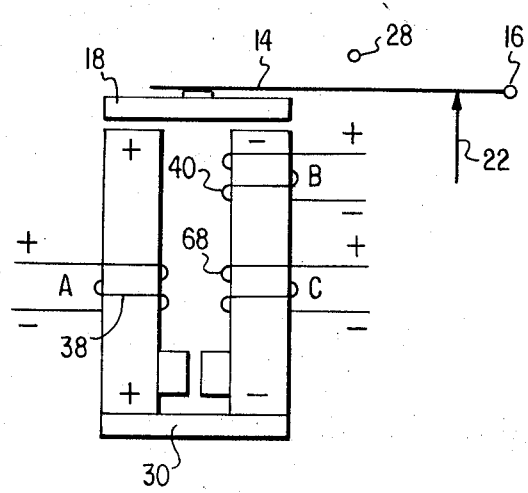
FIG. 4 shows a further modified circuit breaker construction for use as a combined undervoltage/overvoltage protector.
Figure 5:
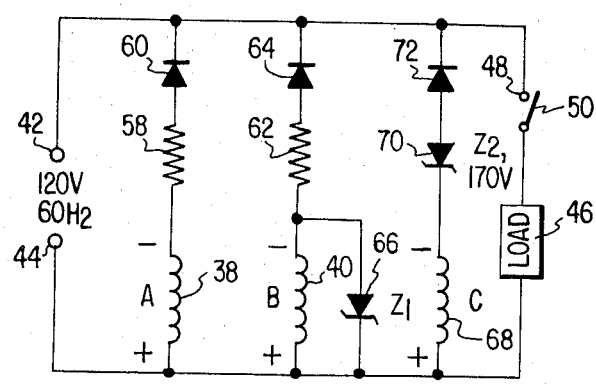
FIG. 5 shows the circuit diagram for the combined undervoltage/overvoltage circuit breaker of FIG. 4.

In FIGS. 4 and 5, like parts bear like reference numerals. In this embodiment, the polarized relay is similar to relay 12 of FIG. 1 but is provided with three coils, namely, the differential coils 38 and 40 of FIG. 1 and the third coil 68 of FIG. 3 to form a combination undervoltage/overvoltage circuit breaker. In this embodiment, the third coil 68 is connected in such a manner that its flux opposes the permanent magnet flux and also the flux from coil 38. The coil 68 flux is additive to the flux from coil 40. At 120 volts RMS (170 volts peak), zener diode 70 is in a marginal conductive state. At 130 volts RMS (180 volts peak), there is a peak voltage of 14 volts across coil 68. If 130 volts RMS is the desired trip voltage, the coil 68 is designed in a manner such that at 130 volts RMS the ampere turns of coil 68 plus the ampere turns of coil 40 exceed the ampere turns of coil 38 by am amount sufficient to release armature 14 (by about 1 ampere turn). Diodes 60, 64, and 72 in FIG. 5 can, of course, be replaced by a single diode, if desired, but separate diodes are shown for the sake of clarity of explanation.

Figure 7:
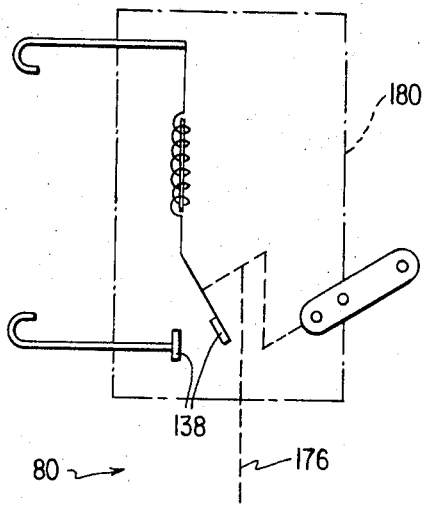
FIG. 7 is a circuit diagram of a ground fault interrupter incorporating the circuit breaker of FIG. 6.
Figure 7:
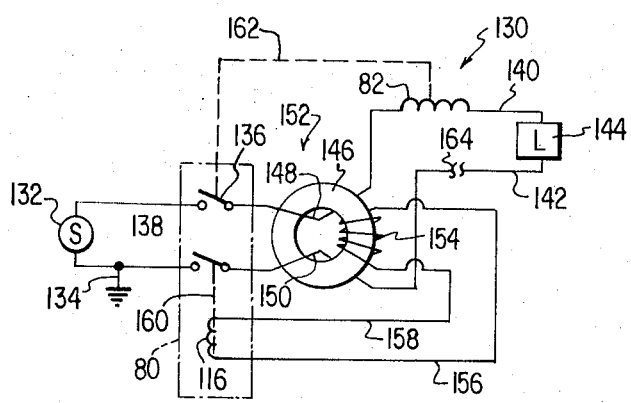
Figure 6:
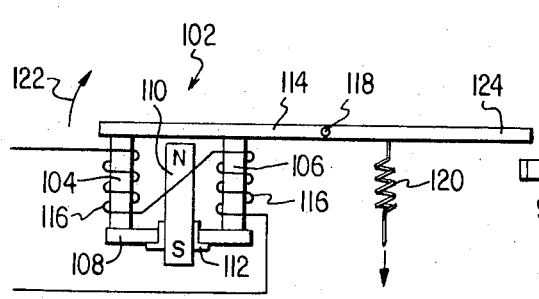
FIG. 6 shows a further modification in which the circuit breaker is constructed to form a ground fault interrupter incorporating overcurrent protection.

FIG. 6 shows a modified circuit breaker construction, generally indicated at 80, particularly designed for use in the ground fault interrupter circuit of FIG. 7. The circuit breaker 80 of FIG. 6 comprises the conventional overcurrent coil 82, polepiece 84, and time delay tube 86. An overcurrent through coil 82 attracts one end of an overcurrent armature 88 which end 90 moves into engagement with polepiece 84 in the direction of arrow 92. For heavy overcurrents, armature end 90 is immediately attracted to the polepiece, but for overcurrents of lesser magnitude, attraction of armature end 90 to polepiece 84 is delayed by delay tube 66 in a well known manner. Armature 88 is pivoted at 94 so that attraction of armature end 90 by polepiece 84 causes its opposite end 96 to engage and rotate the circuit breaker latch sear 98 in the direction of arrow 100.

As previously described, rotation of latch sear 98 trips the toggle mechanism of the circuit breaker, permitting it to collapse and the contacts to open.

In FIG. 6, low power tripping is provided by a polarized relay, generally indicated at 102, comprising a magnetic circuit including a pair of magnetic cores 104 and 106, a magnetic keeper 108, and a permanent magnet 110 which is preferably adjustably received by a threaded hub 112 in keeper 108. In this way, the upper end of permanent magnet 110 may be longitudinally adjusted to be spaced a greater or less distance from the relay armature 114. Wound around cores 104 and 106 are equal sections of a single tripping coil 116, which sections create flux in the cores 104 and 106 in a direction as to oppose the flux from permanent magnet 110.

Relay armature 114 is centrally pivoted at 118 and is biased in a clockwise direction by a preferably adjustable tension spring 120.

In operation, permanent magnet 110 is adjusted to provide the airgap necessary to hold armature 114 against cores 104 and 106 in the position illustrated in FIG. 6. When a low power current is applied to the sections of coil 116, they create a flux in the magnetic circuit which overcomes the flux of the permanent magnet, releasing the armature which is caused to rotate in the direction of the arrow 122 in FIG. 6 under the influence of spring 120. Clockwise rotation of the armature 114 about pivot 118 causes its end 124 to engage circuit breaker latch sear 98, rotating the latch sear in the direction of arrow 100, which in turn causes the circuit breaker toggle to collapse and the contacts to open. Thus, the circuit breaker may be tripped by either armature 88, resulting from an overcurrent through coil 82, or by armature 114, resulting from a low power signal applied to relay coil sections 116.

FIG. 7 shows a ground fault interrupter (GFI) circuit incorporating the breaker 80 of FIG. 6. In FIG. 7, like parts bear like reference numerals. The ground fault interrupter circuit of FIG. 7, generally indicated at 130, comprises an AC source 132 which, by way of example only, may be a conventional 120 volt 60 Hz line source which is illustrated at 134 as having one side grounded. Source 132 is connected through two sets of contacts 136 and 138 by way of leads 140 and 142 to a load 144. These leads pass through a toroidal magnetic core 146 to form the single turn primary windings 148 and 150 of a toroidal transformer 152. The secondary windings 154 of the transformer are connected by leads 156 and 158 to the two-section coil 116 of FIG. 6.

This coil is magnetically coupled to the circuit contacts in the manner illustrated in FIG. 6, as indicated by dashed lines 160 in FIG. 7. Similarly, overcurrent coil 82, which is shown as connected in line 140 is magnetically coupled to circuit breaker contacts 136 and 138 in the manner illustrated in FIG. 6, as indicated by dashed line 162 in FIG. 7.

When an overcurrent appears in the line, this current passes through coil 82 rotating armature 88 of FIG. 6 to trip circuit breaker 80 and open contact sets 136 and 138. Similarly, when a fault occurs to ground, a difference in the current flowing through primary windings 148 and 150 induces a low power voltage in transformer secondary winding 154 which is applied across coil 116. This acts to release armature 114 in FIG. 6, causing it to rotate and to trip circuit breaker 80 opening contact sets 136 and 138 in response to the ground fault.

An important feature of the circuit illustrated in FIG. 7 is that it provides ground fault interruption or ground fault protection even in cases where a break occurs in the grounded line since line voltage is not relied upon for circuit interruption in response to ground faults. Thus, even with a break in the grounded line 142, which break is illustrated at 164 in FIG. 7, a fault occurring from the "hot" lead 140 to ground will still result in the energization of coil 116 and operation of the circuit breaker 80 to open contact sets 136 and 138. A break in the grounded circuit, such as is illustrated at 164 in FIG. 7, might, for example, result from improper wiring of the circuit and if anyone were to touch the "hot" line 140, the full source voltage to ground would still be available and the ground fault interrupter would act to open the circuit to prevent injury in this situation.

Figure 8:
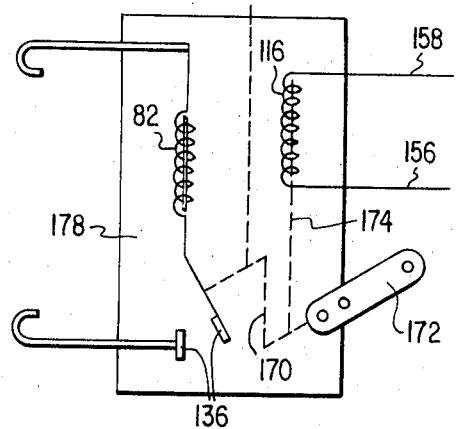
FIG. 8 shows a ganged arrangement of ground fault interrupter circuit breakers.

FIG. 8 is a schematic diagram showing the contact sets 136 and 138 for the circuit breaker 80 of FIG. 7. As described, the circuit breakers comprise a current coil 82 connected in series with the circuit breaker contacts 136. The movable contact of the contact set is operated through a toggle, indicated by the dashed line 170, connected to a conventional circuit breaker handle 172. The toggle is adapted to be released and collapsed either by actuation of the overcurrent coil 82 or the low power relay coil 116. This latter electromagnetic coupling is indicated by dashed lines at 174 in FIG. 8. A second circuit breaker pole containing the contact set 138 is illustrated in FIG. 7 as ganged to the first pole by the dashed line 176. The second pole is preferably identical to the first pole but it may or may not be provided with the low power tripping feature of FIG. 6, as desired. The two circuit breaker poles may be ganged in a well known manner by a common trip bar as disclosed, by way of example only, in assignee's U.S. Pat. No. 3,444,488 or U.S. Pat. No. 3,486,140.

It is apparent from the above that the present invention provides an improved low power electromagnetic circuit breaker in which a conventional toggle mechanism is tripped by the armature of a polarized relay. This provides a simplified, inexpensive and reliable construction particularly adapted for use in conjunction with conventional circuit breaker mechanisms and, if desired, in conjunction with conventional magnetic overcurrent tripping coils and armatures. The low power tripping device may be used in conjunction with an undervoltage protector, an overvoltage protector, a combination of under and overvoltage protection, or in a ground fault interrupter, all as illustrated. The resultant assembly is capable of low cost production and high reliability. Use of a balanced armature minimizes the affect of mechanical shock and vibration on the low power level relay.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An undervoltage protector comprising a pair of relatively movable contacts, a collapsible toggle including a toggle latch mechanically coupled to one of said contacts, a magnetic core, a partial magnetic shunt magnetically coupled to said core, a permanent magnet adjacent said core for polarizing said core, first and second differentially would coils magnetically coupled to said core, an armature including a polepiece adjacent said core and adapted to be restrained against said core by the flux from said permanent magnet, means resiliently biasing said armature away from said core, means for mechanically coupling said armature to said toggle latch whereby said toggle is tripped when said armature moves away from said core, a pair of input terminals, rectifier means coupling each of said coils across said input terminals, and voltage regulator means coupled to one of said coils for maintaining a substantially constant voltage across said one coil.

2. An undervoltage protector according to claim 1 wherein said voltage regulator means comprises a zener diode across said one coil.

3. An overvoltage protector comprising a pair of relatively movable contacts, a collapsible toggle including a toggle latch mechanically coupled to one of said contacts, a magnetic core, a partial magnetic shunt coupled to said core, a permanent magnet adjacent said core for polarizing said core, a coil magnetically coupled to said core, an armature including a polepiece adjacent said core and adapted to be restrained against said core by the flux from said permanent magnet, means resiliently biasing said armature away from said core, means for mechanically coupling said armature to said toggle latch whereby said toggle is tripped when said armature moves away from said polepiece, a pair of shunt terminals, rectifier means, and voltage regulating means, said rectifier means, voltage regulating means and coil all being connected in series with said input terminals.

4. An overvoltage protector according to claim 3 wherein said voltage regulating means comprises a zener diode.

5. A combination undervoltage and overvoltage protector comprising a pair of relatively movable contacts, a collapsible toggle including a toggle latch mechanically coupled to one of said contacts, a magnetic core, a partial magnetic shunt coupled to said core, a permanent magnet adjacent said core for polarizing said core, first and second differentially wound coils magnetically coupled to said core, a third coil magnetically coupled to said core, an armature including a polepiece adjacent said core and adapted to be restrained against said core by the flux from said permanent magnet, means resiliently biasing said armature away from said core, means for mechanically coupling said armature to said toggle latch whereby said toggle is tripped when said armature moves away from said core, a pair of input terminals, rectifier means coupling each of said coils across said input terminals, a first zener diode coupled across one of said differentially wound coils, and a second zener diode coupled in series with said third coil.

* * * * *